United States Patent [19]

Mizuno et al.

[11] Patent Number: 4,943,147
[45] Date of Patent: Jul. 24, 1990

[54] CHOPPING SECONDARY MIRROR SYSTEM

[76] Inventors: Shigeki Mizuno; Takaharu Ueda; Tetsu Yamamoto; Takashi Yumura, all of c/o Mitsubishi Denki Kabushiki Kaisha Oyokiki Kenkyusho, 1-1 Tsukaguchi Honmachi 8-chome, Amagasaki-shi, Japan

[21] Appl. No.: 390,900

[22] Filed: Aug. 8, 1989

[30] Foreign Application Priority Data

Aug. 20, 1988 [JP] Japan .................................. 63-206823

[51] Int. Cl.$^5$ .............................................. G02B 26/08
[52] U.S. Cl. ...................................... 350/486; 350/66; 350/637
[58] Field of Search ............... 350/539, 637, 6.6, 486, 350/487, 99

[56] References Cited

U.S. PATENT DOCUMENTS 4,613,203 9/1986 Proetel et al. ...................... 350/6.6
4,632,501 12/1986 Glynn ................................. 350/6.6

OTHER PUBLICATIONS

"Proceedings of SPIE, vol. 817, pp. 28-33".

Primary Examiner—Bruce Y. Arnold
Assistant Examiner—Jay Ryan
Attorney, Agent, or Firm—Morrison Law Firm

[57] ABSTRACT

A chopping secondary mirror system is provided, in which magnetic circuits of a driving motor for causing a secondary mirror to chop about its rotation axis are mounted to the secondary mirror via a driving motor mounting so that the magnetic circuits function as a balancing mass to position the center of gravity of a whole chopping section on said rotation axis. The driving motor mounting is secured to the secondary mirror at the center of the secondary mirror. Leaf springs are used as vibration damping springs of a reaction force compensator.

15 Claims, 4 Drawing Sheets

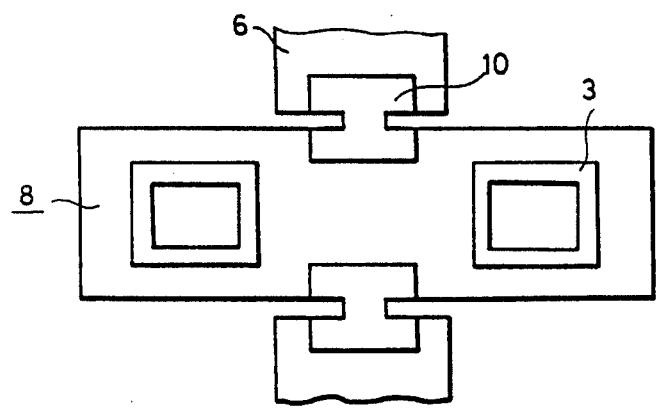
FIG. 5
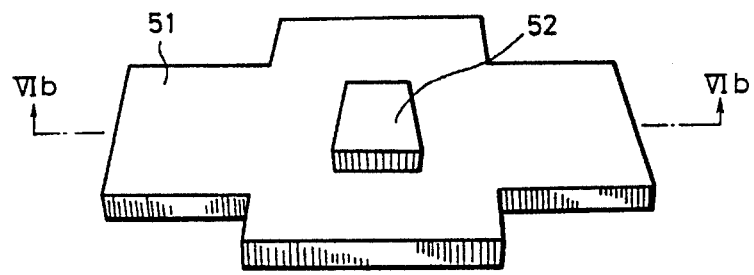

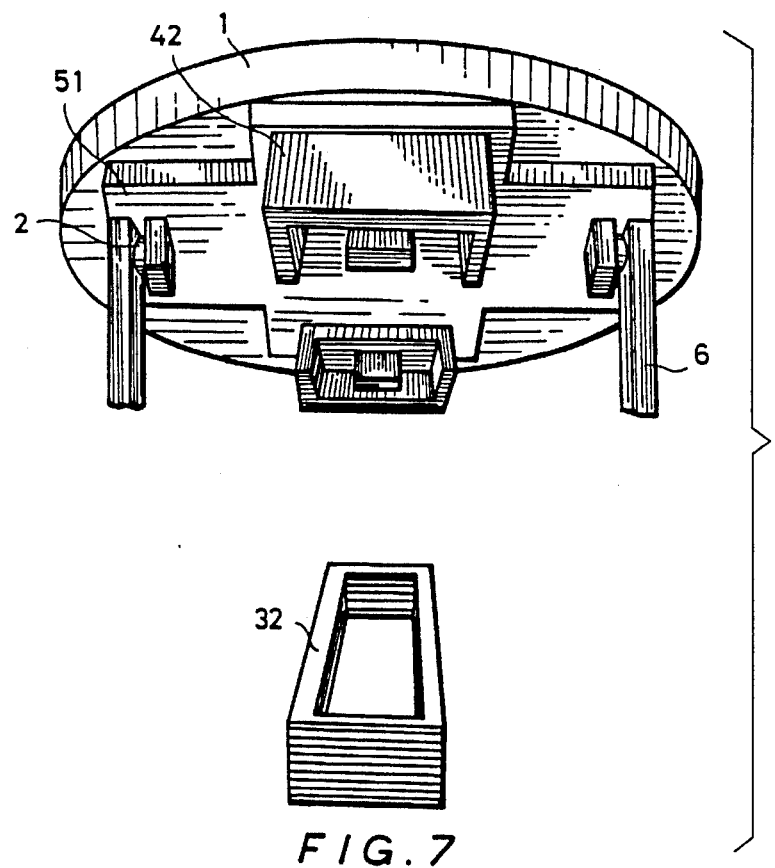
FIG. 7
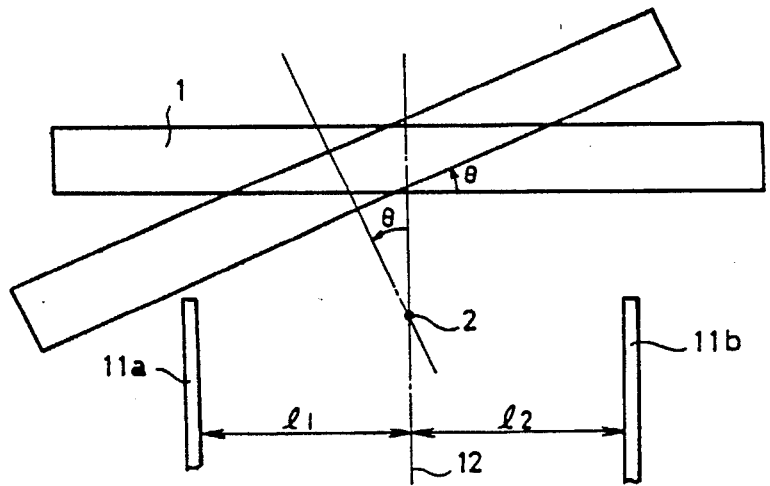

CHOPPING SECONDARY MIRROR SYSTEM

The present invention relates to a chopping secondary mirror system, and, more particularly, to such a system in which a secondary mirror is caused to chop or move quickly so as to remove noise which would be encountered in astronomical observation by, for example, an infrared telescope.

BACKGROUND OF THE INVENTION

A conventional chopping secondary mirror system is shown in, for example, the article "chopping secondary mirror for the ESO 3.6 m telescope" written by A. van Dijssenldonk and A.F.M. Moorwood in *Proceedings of SPIE (The Society of Photo-Optical Instrumentation Engineering), SPIE Ostomeohanical Systems Engineering*, Vol. 817, Pages 28–33 (1987).

In order to position the center of gravity of the chopping secondary mirror system, shown in this article, on the rotation axis of the secondary mirror, a balancing mass must be used exclusively for this purpose. This requires a space for the balancing mass, and when it is desired to use larger driving motors to increase power for driving the secondary mirror to chop, the balancing mass also becomes larger and complicated in shape, which disadvantageously causes the overall size of the secondary mirror system to increase.

Another problem is that the secondary mirror could be deformed due to heat dissipated by a coil arrangement and also due to the weight of the chopping secondary mirror section, which in turn causes reduction of precision of astronomical observation.

This conventional system has still another problem. The conventional system employs flexural pivots in a reaction force compensator which receives reaction force generated when the secondary mirror is oscillated by the driving motors. Springs which form the flexural pivots are very expensive, and, furthermore, they are too flexible to damp vibrations caused by reaction force which is caused by the driving motor action.

An object of the present invention is to provide a chopping secondary mirror system which can be formed small in size and which is free of the above mentioned disadvantages.

Another object of the present invention is to provide a chopping secondary mirror system which has minimum deformation of the secondary mirror caused by, for example, the weight of the chopping secondary mirror section and heat generated by constituent components.

Still another object of the present invention is to provide a chopping secondary mirror system in which vibrations caused by reaction force given by driving motors are efficiently reduced by means of a reaction force compensator, and which can still be manufactured at low cost.

SUMMARY OF THE INVENTION

In a chopping secondary mirror system embodying a first aspect of the present invention, magnetic circuits are secured to a secondary mirror via a driving motor mounting member so that the center of gravity of a chopping secondary mirror section is located on the axis of rotation of the secondary mirror.

In a chopping secondary mirror system embodying a second aspect of the present invention, a driving motor mounting member is secured to the secondary mirror at the center thereof.

In a chopping secondary mirror system embodying a third aspect of the present invention, inexpensive sprigs can be used in a reaction force compensator as springs for damping vibrations caused by reaction force given by the driving motors.

As stated above, in the chopping secondary mirror system embodying the first aspect of the present invention, the magnetic circuits of the motors are mounted on the secondary mirror and acts also as a balancing weight for locating the center of gravity of the chopping secondary mirror section on the rotation axis of the secondary mirror. This makes it possible to eliminate the use of a balancing mass which conventional systems require, so that the system can be small-sized, or more space becomes available for the driving motors and, accordingly, larger motors can be used and, hence, larger driving force are available.

In the chopping secondary mirror system embodying the second aspect of the present invention, because the driving motor mounting member is secured to a central portion of the secondary mirror. the secondary mirror is not deformed by the weight of the magnetic circuits of the driving motors and thermal deformation of the driving motor mounting member caused by heat dissipated from the driving motor coil arrangement hardly affect the secondary mirror so that the amount of deformation of the secondary mirror is minimized.

In the chopping secondary mirror system embodying the third aspect of the present invention, because the reaction force compensator uses inexpensive leaf springs, it is easy to handle the system, adjustment of the spring force provided by the springs is easy, and the compensator is less expensive than conventional flexural pivot compensators.

BRIEF DESCRIPTION OF THE DRAWINGS

FIG, 1 is a perspective view of a portion of a conventional chopping secondary mirror system with a reaction force compensator removed from the system;

FIG. 5 is a plan view of the reaction force compensator shown in FIG. 4:

FIG. 6(*a*) is a perspective view of a driving motor mounting member included in the portion shown in FIG. 3:

FIG. 6(*b*) is a cross-sectional view along VI$_b$—VI$_b$ in FIG. 6(*a*);

FIG. 7 is a perspective view of a portion of a chopping secondary mirror system according to another embodiment of the present invention, with a reaction force compensator removed from the system; and FIG. 8 is useful for explanation of how to detect an angle of rotation of a chopping secondary mirror of the present invention.

DETAILED DESCRIPTION OF THE INVENTION

Now, referring to the accompanying drawings, a conventional chopping secondary mirror system is first described and, then, the present invention is described.

Figure 1:
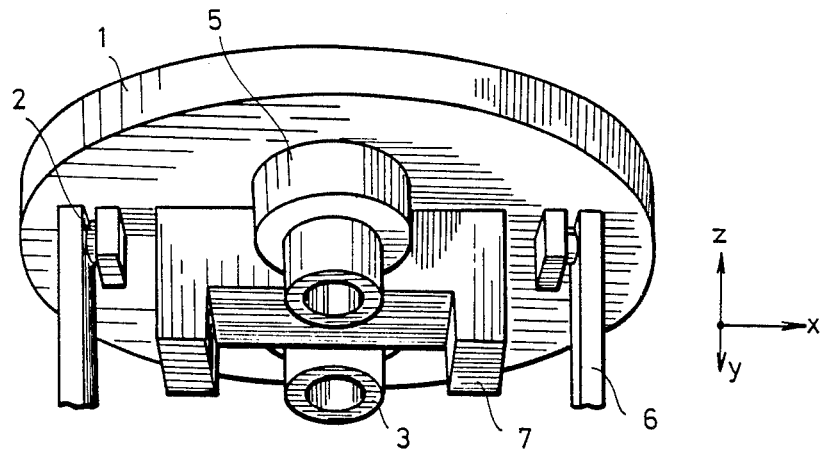
Figure 2:
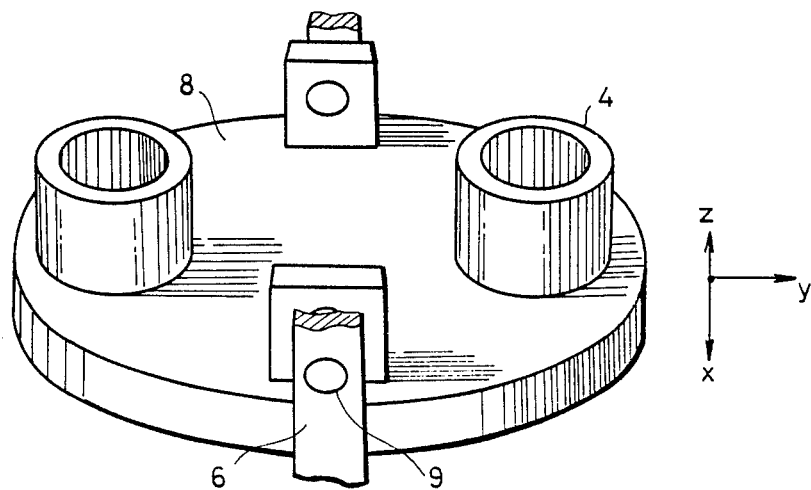
FIG. 2 is a perspective view of a reaction force compensator for use in combination with the portion shown in FIG. 1 to form the conventional chopping secondary mirror system.

FIGS. 1 and 2 show structures of portions oi a conventional chopping secondary mirror system shown, for example, in the previously cited article entitled "chopping secondary mirror for the ESO 3.6 m telescope" in the *Proceedings of SPIE* (The Society of Photo-Optical Instrumentation Engineering). *SPIE Optomechanlcal Systems Engineering*, Vol. 817. Pages 28–33 (1987). FIG. 2 is a view seen at a position angularly displaced by 90 from the position for FIG. 1.

In FIGS. 1 and 2, mounted to a secondary mirror 1 are rotation shafts 2 comprising flexural pivots, a driving motor coils 3 for causing the secondary mirror to chop, driving motor mounting arrangement members 5 for mounting the coils 3 on the secondary mirror 1, and a balancing mass 7. The secondary mirror 1, the coils 3, the driving motor mounting members 5 and the balancing mass 7 form a chopping secondary mirror section. The balancing mass 7 is provided for the purpose of positioning the center of gravity of the chopping secondary mirror section when the mirror 1 is chopping, on the rotation axis of the secondary mirror 1 provided by the aligned axes of the rotation shafts 2.

On a reaction force compensator 8 which compensates for reaction force generated when the secondary mirror 1 is subjected to chopping by he driving motors, there are provided magnetic circuits 4 each comprising a core and a magnet and facing the respective one of the coils 3 on the secondary mirror 1. The reaction force compensator 8 is provided with rotation shafts 9 which comprise flexural pivots. Although shown broken, support arms 6 for the rotation shafts 2 of the secondary mirror 1 of FIG. 1 are also support arms 6 for the rotation shafts 9 of the reaction force compensator 8 of FIG. 2. The coils 3 and the magnetic circuits 4 which form driving motors are disposed to face each other to provide apparatus for causing chopping of the chopping secondary mirror section.

Now, the operation of the chopping secondary mirror system of the above-stated arrangement is described. First, current is applied to the two driving motors comprising the coils 3 and the magnetic circuits 4 to cause force to be generated. The two motors generate couple to cause the chopping secondary mirror section to chop about the secondary mirror rotation shafts 2 supported by the support arms 6. This chopping action enables alternate detection of an object to be observed and its surroundings observed through an infrared telescope to thereby remove astronomical noise. This is called spatial chopping. In this conventional system, the balancing mass 7 is used solely for positioning the center of gravity of the chopping section on the rotation axis of the secondary mirror 1, as stated previously. Let it be assumed that the balancing mass 7 is not present and the center of gravity of the chopping section is not on the rotation axis of &he mirror 1. In such a case, when the chopping secondary mirror system is tilted for astronomical observation moment generated by the weight of the chopping section about the rotation axis of the mirror 1 would act as disturbance torque on the chopping movement of the secondary mirror. The balancing mass 7 is necessary for removing effects of such disturbance torque. Reaction forces generated when the driving motors cause the secondary mirror section to chop would be transmitted to the entire system to cause vibrations. Such vibrations could degrade the precision of the angle of rotation of the secondary mirror, In order to solve this problem. the reaction force compensator 8 having the flexural rotation shafts 9 supported on the support arms 6 is employed. The flexural rotation shafts 9 can attenuate vibrations caused by the driving motor reaction forces so that vibrations transmitted to the entire system can be made as little as possible. Thus, the tube body in which the secondary mirror 1 is disposed hardly vibrates.

As stated above, in this conventional chopping secondary mirror system, in order to locate the center of gravity of the secondary mirror section on the rotation axis of the mirror 1. the balancing mass 7 must be used, which requires a space for the balancing mass 7. When it is desired to use driving motors of larger size to increase the driving force, a balancing mass of complicated shape may be required and/or the size of the chopping secondary mirror system itself may increase.

In addition, the conventional system has another problem that because of heat generated by the motors and also because of the weight of the secondary mirror section, the secondary mirror 1 may be deformed, which causes degradation in precision of astronomical observation.

Furthermore, the flexural pivots used for the reaction force compensator 8 are disadvantageously expensive and too flexible to damp the reaction forces.

Now, one embodiment of the present invention is described with reference to FIGS. 3 through 6. Similar to the conventional system, rotation shafts 2 using flexural pivots and a driving motor mounting member 51 shown in FIGS. 6(a) and 6(b) are mounted on a secondary mirror 1 of FIG. 3. Magnetic circuits 41 forming driving motors together with coils 31 are mounted on the driving motor mounting member 51. The driving motor mounting member 51 has a raised portion 52. which is secured, for example, bonded. to a central portion of the secondary mirror 1. The member 51 is formed of, for example, Invar. With this arrangement in which the driving motor mounting member 51 is secured to the center of the secondary mirror 1, mechanical deformation of the mirror 1 due to the weight of the chopping secondary mirror section and also thermal deformation of the mirror 1 due to heat dissipated from the magnetic circuits 41 can he minimized.

As stated above, the chopping secondary mirror system of the present invention is characterized partly in that the magnetic circuits 41 constituting the driving motors are mounted on the secondary mirror rather than a compensator. The operation of the chopping secondary mirror system of the present invention is similar to that of the conventional system. The magnetic circuits 41 mounted on the secondary mirror 1 in the system according to the present invention can achieve the function oi the balancing mass 7 of the conventional system lo locate the center of gravity of the secondary mirror section on the axis of rotation of the mirror 1 provided by the aligned axes of rotation of the shafts 2, which enables the use of larger driving motors to increase driving force. Or the size of chopping secondary mirror systems can be reduced.

Figure 4:
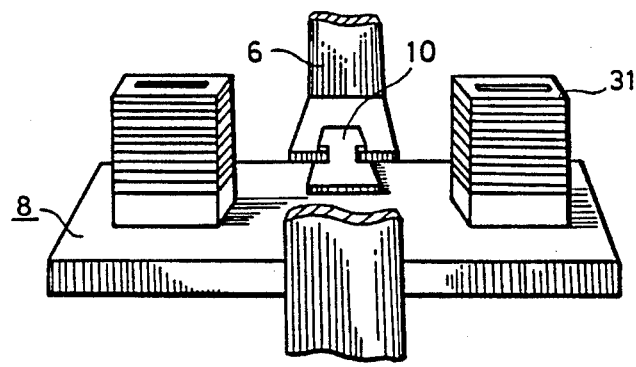
FIG. 4 is a perspective view of a reaction force compensator which is useable in combination with the portion shown in FIG. 3 to form a chopping secondary mirror system according to one embodiment of the present invention.

As shown in FIG. 4, driving motor coils 31 are mounted on the reaction force compensator 8 rather than the secondary mirror 1. Thus, heat generated by the coils 31 are transmitted only indirectly to the magnetic circuits 41 on the secondary mirror 1 through air, which is a good adiabatic medium, present between the coils 31 and the magnetic circuits 41. Accordingly, thermal deformation of the secondary mirror 1 in this system can be made much smaller than in a system in which coils are mounted on the secondary mirror.

In the chopping secondary mirror system according to the present invention, leaf springs 10, rather than flexural pivots. are used as means for providing the rotation shafts for the reaction force compensate&or 8. Thus, the system of the present invention has advantages of low manufacturing cost and easy handling. More specifically, when two flexural pivots are used, it is necessary to precisely align the rotation axes of the two pivots, which needs complicated adjustment. Such complicated adjustment is not required when the leaf springs 10 are used.

Furthermore, by appropriately selecting the thickness of the leaf springs 10, the resonant frequency oi the reaction force compensator 8 can be easily set to a value at which the amount of vibrations given o the chopping secondary mirror system can be minimized.

Figure 3:
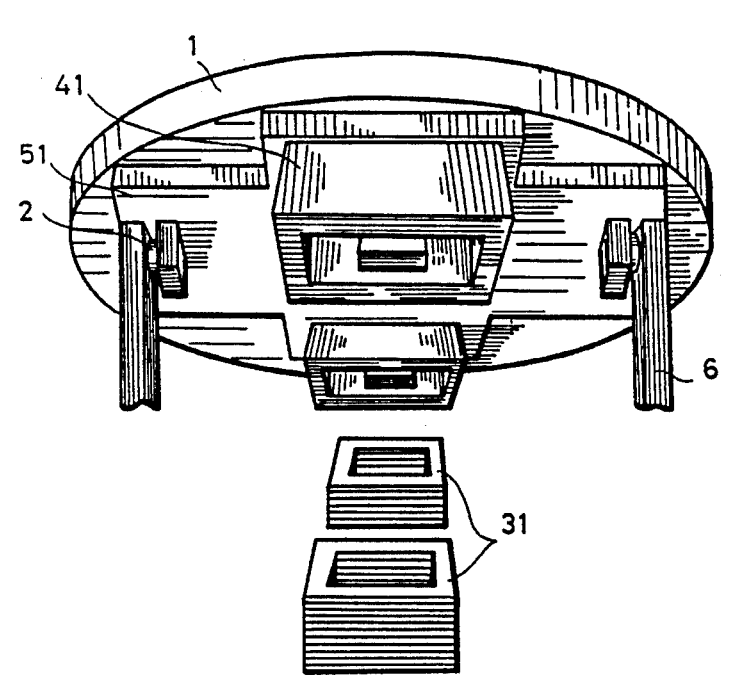
FIG. 3 is a perspective view of a portion of a chopping secondary mirror system according to the present invention, with a reaction force compensator removed from the system.

In the embodiment shown in FIGS. 3 and 4, two sets of coil and magnetic circuit are used to form driving motors, but any driving motors can be used only if their magnetic circuits are mounted on the secondary mirror 1 so as to act also as a balancing mass. For example, as shown in FIG. 7 which shows another embodiment of the present invention, driving motors are provided by a single coil 32 and two magnetic circuits 42. Each of the magnetic circuits 42 comprises the magnetic circuit 41 of FIG. 3 with a portion thereof removed.

This second embodiment shown in 7 has, in addition to the advantages the first embodiment has, another advantage that the rigidity of the system is improved.

As shown in FIG. 8, according to the present invention, an even number of detectors 11a and 11b are disposed symmetrically with respect to the chopping motion of the secondary mirror section for detecting the angle of relation of the secondary mirror 1, and outputs of the detectors 11a and 11b are differentially derived. In FIG. 8, the chopping secondary mirror section chops about the rotation axis 2. For example, two eddy-current type detectors 11a and 11b are disposed at respective locations spaced respectively by $l_1$ and $l_2$ ($l_1=l_2$) from a center axis 12 which extend through the midpoint between the two shafts 2 and through the center of the secondary mirror 1.

Let it be assumed that the portions of the outputs from the eddy-current type detectors 11a and 11b of this embodiment attributable to rotation and thermal deformation of the secondary mirror 1 are $V_r$ and $V_t$, respectively. Since the two detectors 11a and 11b are symmetrically positioned with respect to the axis about which the chopping secondary mirror system chops, the outputs from the detectors 11a and 11b are $V_r+V_t$ and $-V_r+V_t$. Thus, the difference between the two outputs is $(V_r+V_t)-(-V_r+V_t)=2V_r$. Like this, by differentially deriving the outputs of the detectors 11a and 11b, temperature drift components of the outputs can be cancelled, and only the output components attributable to the rotation of the secondary mirror can be derived.

The driving motor mounting member 51 in FIGS. 6(a) and 6(b) is shown to have the raised portion 52 at its center, but the member 51 may have any shape that can reduce mechanical and thermal deformation of the secondary mirror.

Further, although the two driving motors are mounted on the secondary mirror 1 by means of the single mounting member 51 in the illustrated embodiment, a plurality, e.g. two, of mounting members may be used for mounting motors on the secondary mirror. The mounting members are mounted on the secondary mirror 1 at its center portion so that deformation of the magnetic circuits 41 or 42 and heat generated by them are hardly transferred to the secondary mirror, whereby deformation of the secondary mirror can be minimized.

What is claimed:

1. A chopping secondary mirror system, comprising:
   a secondary mirror;
   driving motor means comprising magnetic circuits and coils, for causing said secondary mirror to chop about a rotation axis thereof;
   driving motor mounting means for mounting said driving motor on said secondary mirror;
   means for supporting said secondary mirror for rotation about said rotation axis;
   said driving motor mounting means including a raised center portion on a side thereof facing said secondary mirror; and
   said raised portion of said driving motor mounting means is secured to said secondary mirror at a center portion of said secondary mirror, whereby heat from said driving motor is substantially blocked from reaching said secondary mirror.

2. A chopping secondary mirror system according to claim 1, wherein said driving motor means comprises two magnetic circuits and two coils, and said two magnetic circuits are secured to said secondary mirror via said driving motor mounting means.

3. A chopping secondary mirror system according to claim 1, wherein at least a portion of said driving motor mounting means is a material having a small temperature coefficient of expansion.

4. A chopping secondary mirror system according to claim 3, wherein said material is Invar.

5. A chopping secondary mirror system according to claim 3, wherein said raised portion is disposed on said driving motor mounting means and said at least a portion includes at least said raised portion.

6. A chopping secondary mirror system, comprising:
   a secondary mirror;
   driving motor means comprising magnetic circuits and coils, for causing said secondary mirror to chop about a rotation axis thereof;
   driving motor mounting means for mounting said driving motor means on said secondary mirror;
   support arm means for supporting means for providing said rotation axis of said secondary mirror;
   said magnetic circuits are secured via said driving motor mounting means to said secondary mirror so that the center of gravity of an overall chopping section is located on said axis of rotation;
   said magnetic circuits include two magnetic circuits and said at least one coil includes one coil.

7. A chopping secondary mirror system, comprising:
   a secondary mirror;
   driving motor means comprising magnetic circuits and coils, for causing said secondary mirror to chop about a rotating axis thereof,
   driving motor mounting means for mounting said driving motor means on said secondary mirror:
   support arm means for supporting means for providing said rotation axis of said secondary mirror; and a reaction force compensator comprising said coils and springs, for damping vibrations generated by reaction forces generated by the operation of said driving motor means:

wherein said springs are leaf springs.

8. A chopping secondary mirror system according to claim 7, wherein said driving motor means comprises two magnetic circuits and two coils, said two magnetic circuits are secured to said secondary mirror via said driving motor mounting means, and said two coils are secured to said reaction force compensator.

9. A chopping secondary mirror system according to claim 7, wherein said driving motor means comprises two magnetic circuits and one coil, said two magnetic circuits are secured to said secondary mirror via said driving motor mounting means, and said on coil is secured to said reaction force compensator.

10. A chopping secondary mirror system, comprising:
a secondary mirror;
driving motor mean comprising magnetic circuits and coils, for causing said secondary mirror to chop about a rotation axis thereof;
driving motor mounting means for mounting said driving motor on said secondary mirror;
means for supporting said secondary mirror for rotation about said rotation axis;
at least one of said driving motor mounting means and said secondary mirror including a raised center portion on a side thereof facing the other thereof;
said raised portion securing said driving motor mounting means and said secondary mirror at a center portion of said secondary mirror, whereby heat from said driving motor is substantially blocked from reaching said secondary mirror;
said driving motor means comprises two magnetic circuits and one coil, and said two magnetic circuits are secured to said secondary mirror via said driving motor mounting means.

11. A chopping secondary mirror system comprising:
a secondary mirror;
means for mounting said secondary mirror for rotation about a rotation axis;
magnetic circuits of a driving motor;
said magnetic circuits being affixed to said secondary mirror;
said magnetic circuits providing a balancing mass effective to locate a center of gravity of said secondary mirror, including said means for mounting, and said magnetic circuits, on said rotation axis;
at least one coil of said driving motor; and
said at least one coil being mounted off said secondary mirror in a position allowing magnetic interaction with said magnetic circuits, whereby a heat of said at least one coil is maintained remote from said secondary mirror.

12. A chopping secondary mirror system according to claim 11, wherein said driving motor means comprises two magnetic circuits and two coils, and said two magnetic circuits are secured to said secondary mirror via said driving motor mounting means.

13. A chopping secondary mirror system comprising:
a secondary mirror;
a reaction force compensator spaced from said secondary mirror;
support means for joining said secondary mirror to said reaction force compensator;
said support means including means for permitting said secondary mirror to rotate about an axis of rotation;
at least one magnetic circuit affixed to said secondary mirror
said at least one magnetic circuit having a mass and a moment effective for positioning a center of gravity of said secondary mirror, including said at least one magnetic circuit affixed thereto, on said axis of rotation;
at least one coil affixed to said reaction force compensator; and
said at least one coil being positioned for magnetic interaction with said at least one magnetic circuit, whereby chopping motion of said secondary mirror system is enabled.

14. A chipping secondary mirror system according to claim 13, wherein said support means further includes resilient means for connecting to said reaction force compensator.

15. A chopping secondary mirror system according to claim 14, wherein said resilient means includes at least one flat spring.

* * * * *

UNITED STATES PATENT AND TRADEMARK OFFICE
CERTIFICATE OF CORRECTION

PATENT NO. : 4,943,147

DATED : 07/24/90

INVENTOR(S) : Shigeki Mizuno; Takaharu Ueda; Tetsu Yamamoto; Takashi Yumura

It is certified that error appears in the above-identified patent and that said Letters Patent is hereby corrected as shown below:

On the title page, Assignee should read:

--Mitsubishi Denki Kabushiki Kaishi,
Tokyo, Japan--.

Signed and Sealed this

Twenty-fourth Day of December, 1991

Attest:

HARRY F. MANBECK, JR.

*Attesting Officer*      *Commissioner of Patents and Trademarks*